Sept. 2, 1952  R. LUCHSINGER-CABALLERO  2,609,026
REPLACEABLE TREAD TIRE
Filed April 3, 1948  4 Sheets-Sheet 1
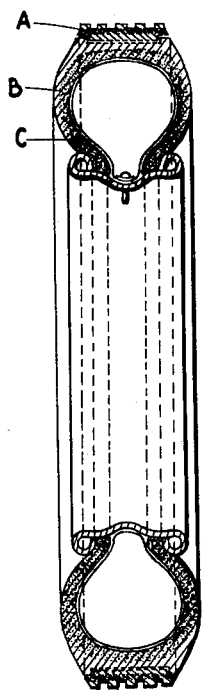
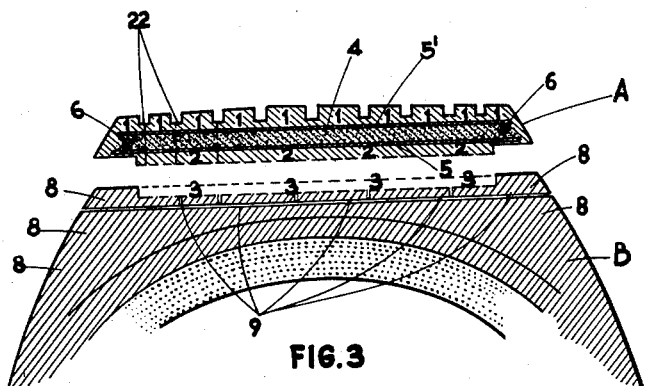
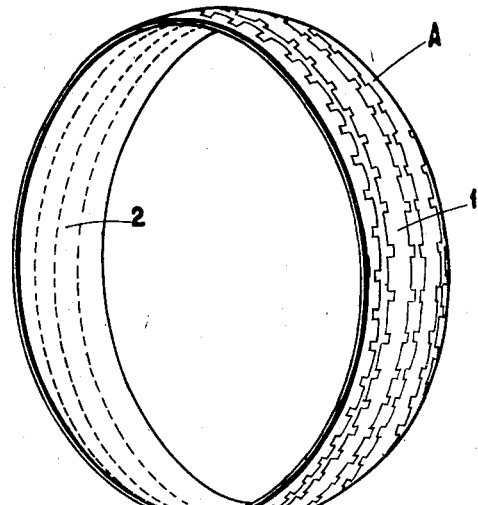
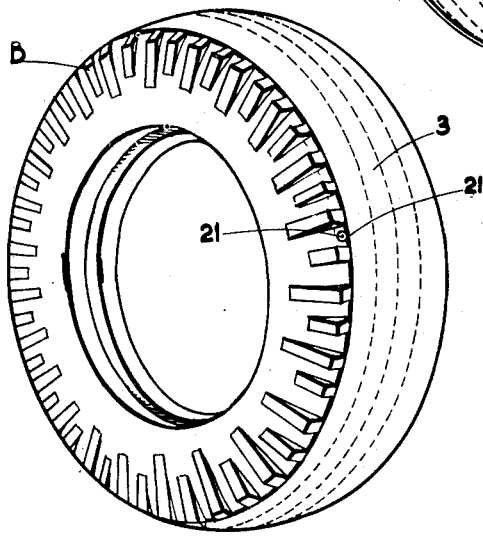
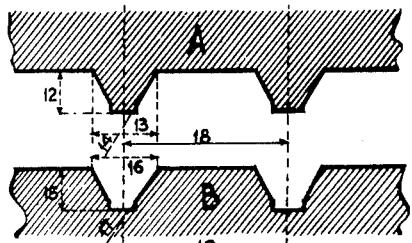
INVENTOR:
RODOLFO LUCHSINGER-CABALLERO
BY Fritz G. Hochwald
AGENT Sept. 2, 1952  R. LUCHSINGER-CABALLERO  2,609,026
REPLACEABLE TREAD TIRE
Filed April 3, 1948  4 Sheets-Sheet 2

INVENTOR:
RODOLFO LUCHSINGER-CABALLERO
BY
AGENT

Sept. 2, 1952  R. LUCHSINGER-CABALLERO  2,609,026
REPLACEABLE TREAD TIRE
Filed April 3, 1948  4 Sheets-Sheet 3
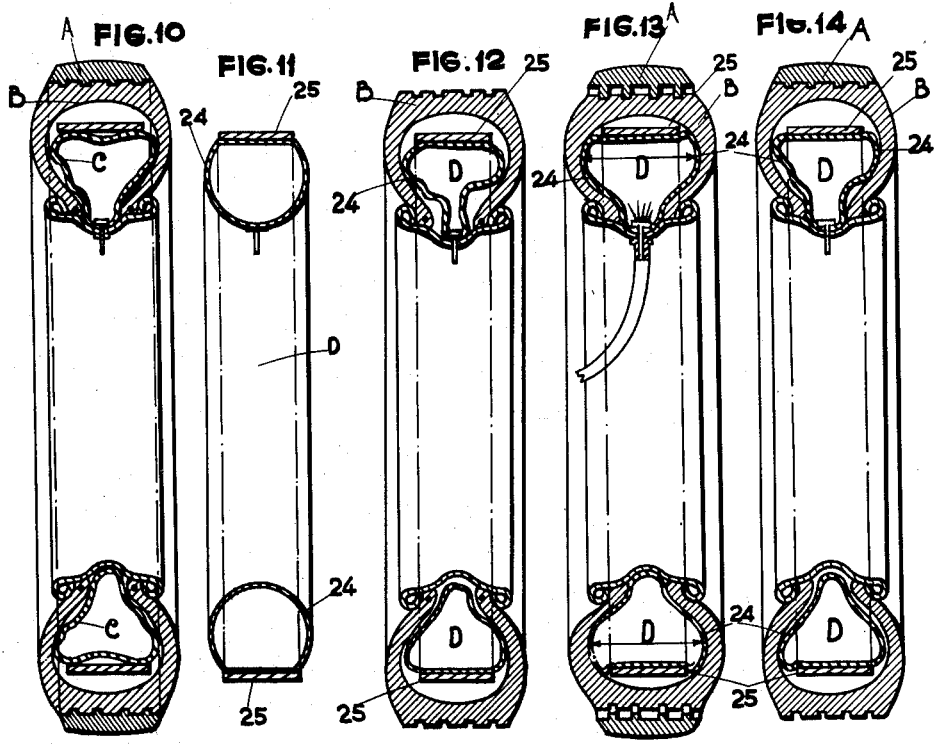
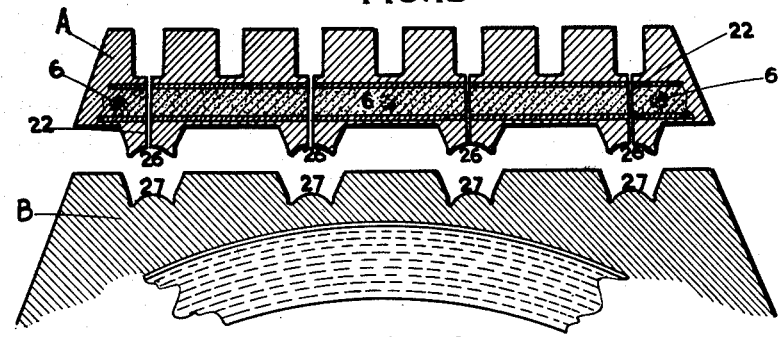
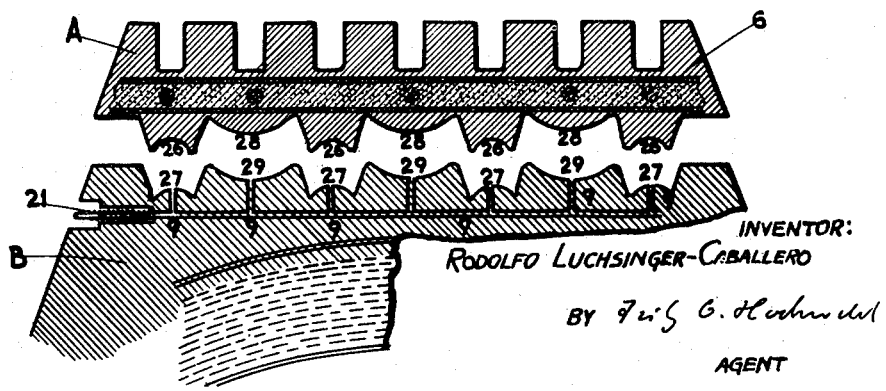
INVENTOR:
RODOLFO LUCHSINGER-CABALLERO
BY
AGENT Sept. 2, 1952  R. LUCHSINGER-CABALLERO  2,609,026
REPLACEABLE TREAD TIRE
Filed April 3, 1948  4 Sheets-Sheet 4
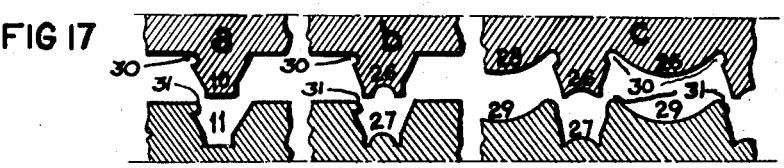
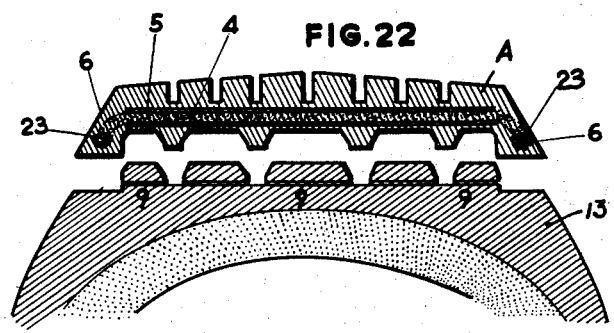
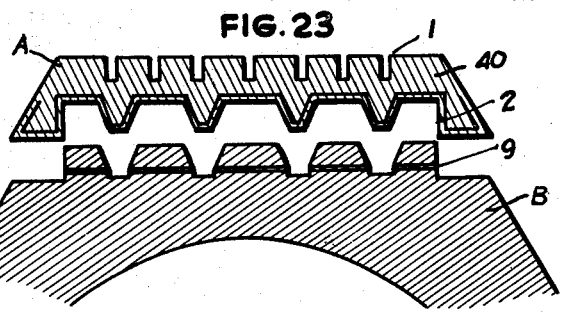
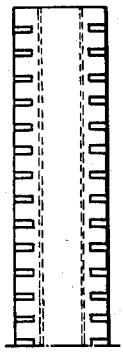
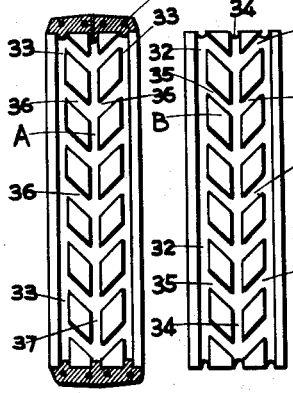
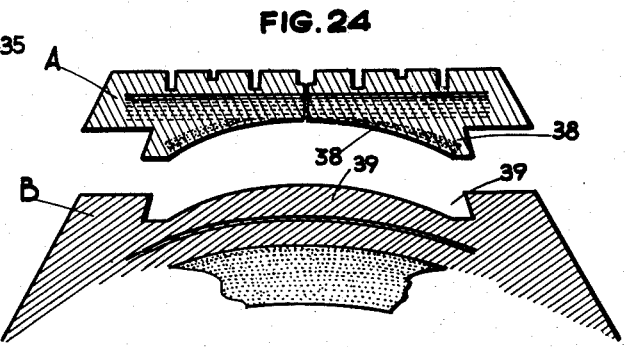
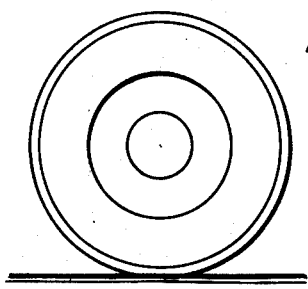
INVENTOR:
RODOLFO LUCHSINGER-CABALLERO
BY [signature]
AGENT Patented Sept. 2, 1952

2,609,026

UNITED STATES PATENT OFFICE 2,609,026

REPLACEABLE TREAD TIRE

Rodolfo Luchsinger-Caballero, Madrid, Spain

Application April 3, 1948, Serial No. 18,787
In Spain September 26, 1947

4 Claims. (Cl. 152—176)

This invention relates to pneumatic tires and to a method of assembling the same.

The first and principal object of the invention is to prolong the life of pneumatic tires for wheels of all kinds of vehicles such as automobiles, trucks, buses, trolley buses, motorcycles, gun-carriages, carts, coaches, and the like.

Another object of the invention is to provide a pneumatic tire in which the non-skid tread may be changed and replaced at will, not only when required because of its wear but also when the road conditions—dry, slippery or snow-covered—suggest such change for the better driving of the vehicle.

Other objects and advantages will be apparent from a consideration of the specification and claims.

The problem of prolonging the life of pneumatic tires has been solved by a new principle or concept upon which the invention is based. It consists in composing the pneumatic tire of two separate but completely interdependent and interlocked parts, namely the tread portion A and the cover or casing B, see the diagrammatic cross section in Fig. 1. Said two parts are connected with each other by a thorough mutual embedding of their two profiles, which are modeled for this purpose in a suitable form to ensure an airtight junction of tread and cover and an air vacuum between the assembled profiles by means of special air discharge channels or bores which can be opened and closed and are disposed in either of said two parts.

When joining the tread and cover, said channels will allow an exit to the air entrapped between the profiles. By closing subsequently the openings of said channels a vacuum is maintained between the profiles, which ensures the secure junction of the tread to the cover to form a unitary homogeneous body. By opening said channels and allowing air to enter in between the profiles, the tread portion can be readily dismounted and replaced by another tread portion when required, as will be seen from the detailed description following, in which reference is had to the attached drawings which show by way of example diagrammatically some embodiments of the invention.

In the drawings,

Fig. 1 is a cross sectional view taken through a pneumatic tire embodying the invention;

Fig. 2 is, on a larger scale, a cross sectional view of the tread portion and the adjacent parts of the cover;

Fig. 3 is a diagrammatic perspective view of the tread band, showing diagrammatically a system of air discharge channels in the cover and alternately a similar system in the tread portion;

Fig. 4 is a perspective view of the whole tire;

Fig. 6 is a fragmentary sectional view of a detail of the coupling profile;

Fig. 10 is a view similar to Fig. 9 showing the inner tube in deflated state;

Fig. 11 is a side elevational view, partly in section, of a special device adapted to facilitate the assembling of the tire;

Fig. 12 is a sectional view showing the device of Fig. 11 inserted in the cover of the tire;

Figs. 13 and 14 are similar to Figs. 9 and 10 showing the consecutive stages of the assemblage of the tire by means of the device shown in Fig. 11;

Figs. 15 and 16 are similar to Fig. 5 and show modifications of the coupling profile and the air discharge system;

Fig. 17 is, on a larger scale, a fragmentary sectional view of various other coupling profiles according to the invention;

Figs. 18 and 19 are, on a reduced scale, developed plan views of the crown of the cover showing diagrammatically different contours of the marginal portions;

Fig. 20 is, on a reduced scale, a developed plan view of the crown surface of the cover showing a modification of the coupling profile;

Fig. 21 is a developed plan view of the corresponding profile of the inner face of the tread portion;

Fig. 22 is a cross sectional view similar to Fig. 5 showing a specific form of the margins;

Fig. 23 is a similar cross sectional view of a modification of the invention showing a rigid construction of the inner part of the tread portion and channels in the profile of the cover for removing air;

Fig. 24 is a cross sectional view similar to Fig. 5 showing a reinforced tread portion and another modification of the coupling profile;

Fig. 25 is a side view of a tire under load in contact with the road surface.

Figure 5:
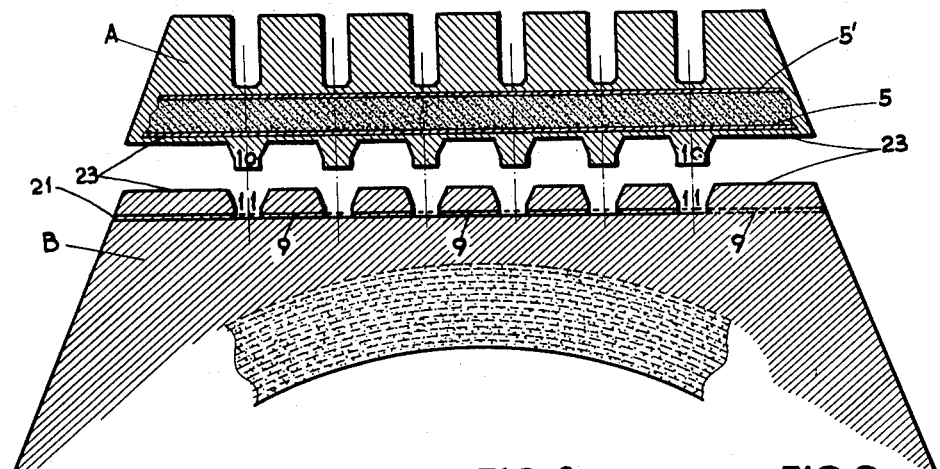
Fig. 5 is a view similar to Fig. 2 showing some details of the construction.

As shown in Figs. 1 and 2, the tread portion A comprises a generally flexible endless annular band without coupling members presenting at its outer face a smooth or non-skid surface, 1, whichever is desired, whereas the inner face is provided with a profile 2 designed for being completely embedded in the conforming profile 3 of the crown of the cover B in such a way that tread A and cover B when assembled constitute an integrated homogeneous body wherein the interchangeable tread portion is firmly and immovably secured by the combined action of the profiles and the vacuum produced therebetween.

To simplify the description, the profile 2 of the inner face of the interchangeable tread portion A may be designated as the "coupling profile of the tread" and the profile 3 of the crown of the cover B as the "coupling profile of the cover," and both profiles 2 and 3 may, for convenience, be designated as "coupling profiles."

The assemblage of the tread portion A and the cover B may be brought about by providing their coupling profiles with coordinated conforming elevations and depressions, for instance in the form of ribs or ridges and furrows or grooves, projections and recesses, protuberances and holes, and the like, which may be convex or concave. A concave form of the coupling profile 3 of the cover B will then correspond to a convex form of the coupling profile 2 of the tread A, and vice versa. Similarly, a rib will correspond to a groove, a projection to a recess, and vice versa.

In the diagrammatic Figs. 1, 2, 3 and 4 the two coupling profiles are shown in dotted lines indicating that they relate to any form of coupling that is capable of embedding the tread portion in the cover and of remaining securely engaged under the action of a vacuum produced between said profiles.

As the profile of the tread portion A when assembled with the cover B will encircle the profile of the latter and adjust itself firmly thereto over the whole circumference, it will be seen that the inner face or coupling profile 2 of the tread portion will assume a flat or more or less curved cross section depending on the flat or curved surface, as viewed in side elevation, of the crown or profile 3 of the cover B to which it is coupled. With respect to coupling the tread to the cover the flat form as shown in Figs. 1, 2 and others seems to be preferable.

Since the invention can be applied to all types of pneumatic tires without exception, such as tires of high or low pressure (balloon or superballoon) or tires having extensible, rigid (straight side) or other beads or tires for rims of all kinds, the lower part of the side walls of the cover B and the beads are indicated in the drawings only by dotted lines or not shown at all. The road-engaging surface of the tread portions A may be smooth or may have such non-skid projections or designs as are considered most appropriate for dry, slippery or snow-covered roads, etc.

In the diagrammatic Fig. 2 and others referring to the form of the coupling profiles, the tread portion A is represented, for the sake of distinctness, separated from, or superposed on, the respective cover B instead of being shown in the coupled position.

The tread portion A, Fig. 3, consists, as already mentioned, of an endless flexible band without assembling members and forms a ring or crown provided on its outer face with a smooth or non-skid road-engaging surface 1 and on its inner face with a profile adapted to engage the conforming coupling profile of the cover or casing B; it is made of flexible materials which offer the greatest possible resistance to wear, heat, moisture, and particularly to stresses in longitudinal and transverse directions. The manufacture of the treads may be carried out with the exclusive use of natural or synthetic rubber or of mixtures of rubber or similar materials with other appropriate substances, provided that the necessary resistance to wear and to deformations in all directions is obtained.

However, it is difficult or impossible to obtain said resistance to the necessary extent by the exclusive use of natural or synthetic rubber or other similar materials since the resistance of the tread A to tearing and to deformation in lateral and longitudinal directions must necessarily be very considerable because of the inflation pressures and the load and speeds to which the pneumatic tires are subjected. Therefore, the tread portions A made of rubber or similar substances are preferably provided with reinforcements 4, Fig. 2, which may consist of strands or layers of cord or of endless strips of natural or synthetic resistant fabrics, which are superimposed, rubberized, calendered and vulcanized; the reinforcement must be so calculated as not to deprive the tread A as a whole of its flexibility and to exclude completely any substantial extension or elongation even when subjected to great stretching forces. The resistance of the tread A as a whole must also be sufficient to take up without longitudinal or lateral deformation any excessive pressure of the inner tube, which, by carelessness or accident, may be produced in the cover B to which it is secured. Accordingly, the insert in rubber treads A will be built up and arranged in any convenient manner for attaining a complete or almost complete resistance to stretching and expanding. Therefore, the strength of the reinforcements or breakers, the thickness of the rubber in the non-skid surface 1, the thickness of the coupling profile 2 and with one word the over-all thickness and strength of the whole tread portion A will always be in direct relation to the type of tire constituted by the assembly of tread A and carcass B.

In certain cases such as in special tires, giant or others, the tread A and its margins may be provided in addition with wires or filaments or reinforced by rods or metal cables 6, both in flat and rounded treads, as viewed in side elevation.

Generally, it may be stated that in the various tire types it is very convenient to place in the tread portion A, in addition to a suitable insert or reinforcement, one or if necessary two strips or layers 5, 5' (Fig. 2) of natural (asbestos) or synthetic preferably heat insulating fabric, the one of which, 5, is placed between the insert and the base of the coupling profile of the tread A and the other, 5', may be placed, if necessary, between the insert and the base of the non-skid surface.

Independently of said heat insulating strips or layers 5 and 5' it is also possible to make the insert or reinforcement itself of, or incorporate therein, strips or layers of synthetic heat insulating cord or fabric.

The over-all thickness of the tread A, Fig. 2, will correspond to the total of the thickness of its non-skid surface 1 plus the thickness of the zone containing the reinforcements 4, the squeegee strips, if any, and the heat insulating layers 5 plus the thickness of the coupling profile 2.

The diameter of the tread portion A must always be exactly calculated so as to encircle firmly the cover over the whole circumference when its coupling profile is thoroughly embedded in that of the cover B (Fig. 1); it forms the tread surface of the tire constituted by the assembly of the tread portion A and the cover B with a corresponding air tube C.

In one embodiment of the invention the tread portion A is provided with channels or bores, capable of being closed and opened; in the open state, they serve for removing entrapped air when the tread is joined to the cover B and in the closed state they ensure an air vacuum coacting between the assembled profiles.

The manufacture of the tread portion A may often present a certain analogy to the construction of trapeziform rubber transmission belts, the difference being, of course, that the outer face of the tread portion A must present a denser rubber surface, smooth or with any desired non-skid design, whereas its inner face must be provided with a profile designed for engaging or dovetailing into the profile of the corresponding cover B, and also that the tread portion A contains conveniently inserted heat insulating strips or layers and special bores or channels for the removal of air, which channels can be closed and opened unless the conforming coupling profile of the cover portion is provided with such air discharge channels.

The manufacturers will have to adopt the combinations and mixes of natural or synthetic rubber with natural or synthetic materials which are most suitable for obtaining the greatest solidity and strength of the tread portion A, its coupling profile and its non-skid surface. For the latter, there may be employed also certain modern mixes of rubber with abrasive materials and the like, which form a composition of good gripping action and excellent traction properties on all road surfaces and which can be subjected to the normal molding process.

The preparation of the tread portion A will be carried out by molding, bombing or other appropriate methods or processes and by means of machinery, installations and implements adapted to its manufacture in large or limited series.

The foregoing details and generalities with respect to the tread portion refer to flexible treads made of rubber or similar natural or synthetic materials most suitable for its manufacture; the use of other natural or synthetic flexible materials, however, is not excluded, provided that they satisfy the recited conditions of solidity and resistance to wear, expansion and extension in the construction of the tread portion A.

The reinforcement or insert of the tread portion A may consist, instead of fabric or cord layers, for instance of a leather band the ends of which are joined in a convenient manner to form a ring or rim; this ring carries on its outer face a non-skid surface and on its inner face the appropriate coupling profile, both made of rubber or another suitable material. It is even possible to form a completely rigid tread portion by using instead of leather a ring or rim of light metal (Duralumin) or other pressed metal or preferably of heat resistant and insulating plastics, covered on the outer face with an anti-skid surface and on the inner face with an adequate coupling profile, both made of rubber or other appropriate materials.

The non-skid surface and the coupling profile may be applied and bonded by suitable means to a rim or ring made either of leather or of metal or a suitable plastic material. In the case of completely rigid tread portions constituted by a metal rim or ring or preferably a rim or ring made of heat insulating plastic material, the coupling profile may be modeled or worked out at the inner face in the material of the rim or ring itself in such a way as to fit into the corresponding profile of a cover B as diagrammatically indicated in Fig. 23, where the rigid rim or ring 40 is provided on its outer face with a non-skid rubber surface 1 and the coupling profile 2 is pressed or worked in the rim or ring material itself.

Like the rubber treads, also the treads A constituted by a leather rim or ring as well as those formed of metal or plastic material will be provided, with small channels for removing the air unless such channels are disposed in as shown in Fig. 23.

The use of treads A which are completely rigid but present as a whole a certain elasticity may be indicated for buses and heavy duty trucks which travel over smooth surfaces, such as on well paved roads, and at very moderate speeds, and will, therefore, be rather limited.

Accordingly, the treads A have to be generally and in the great majority of cases flexible and made of rubber or similar materials and reinforced by inserts, of which the nature, strength and rubber coating will always be in direct relation to the type of the particular tire constituted by the assembly of tread and cover. Therefore, whenever in this specification reference is had to the tread A, the tread is understood to be flexible unless specifically stated otherwise.

The cover or carcass B of the tire, Figs. 1 and 4, will be built up according to norms, requirements and methods within the knowledge of those skilled in the industry, by molding, bombing or other appropriate processes using suitable rubberized cords or fabrics, mixes of natural or synthetic rubber, rubber derivatives or substitutes, an appropriate number of cord plies or layers of natural or synthetic fabrics, rubberized, superimposed coated with rubber or similar material, conveniently calendered and cured, etc. in order to resist fully to the inflation pressures, loads and speeds to which the tire is subjected.

The manufacture of the carcass differs, however, from that for normal tires insofar as the conventional non-skid tread band has to be replaced by a band 8, which will be designated as "coupling band"; this band carries the coupling profile 3 of the carcass B, which profile is modeled exactly conforming to the corresponding coupling profile of the tread portion A, and is provided with air discharge channels 9 unless such channels are provided in the tread portion. The thickness and resistance of said "coupling band" 8 of the covers B will also be in direct relation to the type of tire formed by the assembled tread and cover but only to the degree indispensable with respect to said thickness and resistance, since it has to be taken into account that the robust construction of the tread A and the particular manner of its air vacuum connection with the cover impart to the latter a strength at least twelve times greater than that of the most robust tread bands of normal covers.

As a matter of fact, it can be estimated that for tires of small and medium section the reinforcement and strengthening imparted by the tread portion A of this invention to the cover B is about twelve times greater than that of the most solid and robust tread bands of normal covers, and may be about fifty times greater for special tires of large or giant section. In practice the thickness and resistance of said "coupling band" 8 of the cover B must be only sufficient to carry the air discharge channels and to permit, without reducing its strength and cushioning, of fitting together and dovetailing the tread portion A with the cover B by embedding completely their respective profiles into each other; this offers no difficulty since, as will be shown hereinafter, coupling profiles with very low relief but provided with air discharge channels are sufficient to secure the firm assemblage of the tread and cover.

In giant tires, the air discharge channel 9 of the coupling band 8 of the cover B may further be provided in the exit port 21 (Fig. 16) with a suitable valve device for the removal of the air by suction or simply a threaded tube for hermetically closing the channel.

Considering that the tires manufactured according to the norms of this invention may reach a ten times greater durability than the best normal tires, the side walls of the covers B, Fig. 4, have to be particularly strong and the outer walls are preferably provided with projections of great strength and efficiency protecting the scraping action of the curb; said projections, conveniently disposed for serving as a defense, contribute at the same time to the cooling of the tires.

The tire constituted by the assembly of the tread A and the cover B provided with the corresponding inner air tube is, therefore, made up of three separate parts, namely: tread portion A, cover or carcass B, and inner tube C (Fig. 1).

The slight increase in the over-all height of said tire, as a consequence of the coupling of the tread A to the cover B, may be taken into account when manufacturing the cover B, and may, if desired, be advantageously corrected by increasing slightly the section of the cover B, but the increase is in fact so insignificant that it need not be considered under this point of view.

For putting the invention into practice, there follows hereinafter a more detailed description of some preferred forms of coupling profiles 2 and 3 (Fig. 2), which are particularly suitable and are sufficient, either alone or in combination with each other, to bring about when provided with air discharge channels a hermetical juncture of the tread A and cover B in the different cases and tire types.

a. A form of the coupling profile provided with air discharge channels 9 in the cover or with such channels 22 in the tread portion is shown diagrammatically in cross section in Fig. 5; here the tread portion A is provided with a coupling profile composed of a plurality of continuous parallel peripheral ribs 10 of trapeziform section constituting the coupling profile of the cover B over the whole contour of its crown.

Whenever reference is had in this description to the "dimensions of the ribs" it is to be understood that they always apply also to the dimensions of the respective grooves and vice versa.

The controlling dimensions and measures of the ribs are, Fig. 6, the height 12, the thickness of the base 13, the angle of inclination 14, and the space or distance 18 between the ribs. The corresponding dimensions of the grooves are the depth 15, the width 16, the angle of inclination 17 of the walls, and the space or distance 19 between the grooves. It will be observed that the ribs and grooves may be spaced more closely or may be higher and deeper respectively towards the margin of the profile than at its center, or inversely.

A coupling profile may consist of a single rib and corresponding groove but generally it will comprise several ribs and grooves.

The number of the ribs and grooves necessary for a perfect and secure coupling is in inverse relation to their dimensions; accordingly, the more ribs and grooves, the smaller the dimensions of the same, and vice versa.

The practice will indicate better than any formula the number of ribs and grooves, their dimensions, angles of inclination and spaced relationship, which is best suitable to be chosen according to the section and type of the tire, as well for this form of coupling as for all other couplings consisting of ribs and grooves described hereinafter.

Generally, a plurality of ribs and grooves of reduced dimensions seems to be preferable because it contributes to a greater solidity and improved cushioning of the coupling band 8 of the cover B.

In addition, and also as a general indication, it may be said that the height of the ribs of the profiles described herein may vary from 4 to 8 mm. without excluding the use of coupling profiles composed of ribs up to a height of 10 mm. and somewhat more in covers for exceptionally large or giant tires.

Notwithstanding the small height of the ribs and the relative flexibility of the covers of medium and large section it will be readily understood, when the width of the coupling profile of the covers B is considered and when it is borne in mind that the diameter of the tread portion A is exactly calculated so as to encircle the cover firmly over its whole contour, that the mounting of the tread and cover by means of levering means and the like and by other manipulations would be impossible without injury to covers B of reduced section and will be completely impossible for covers of medium or large section.

Therefore, it is necessary to resort to some special manipulations and devices by means of which the assemblage of tread and cover is not only brought about without injury and any effort but is effected almost automatically in a few minutes most easily in all types of covers B for tires of small, large or giant section.

Figures 7, 8, 9:
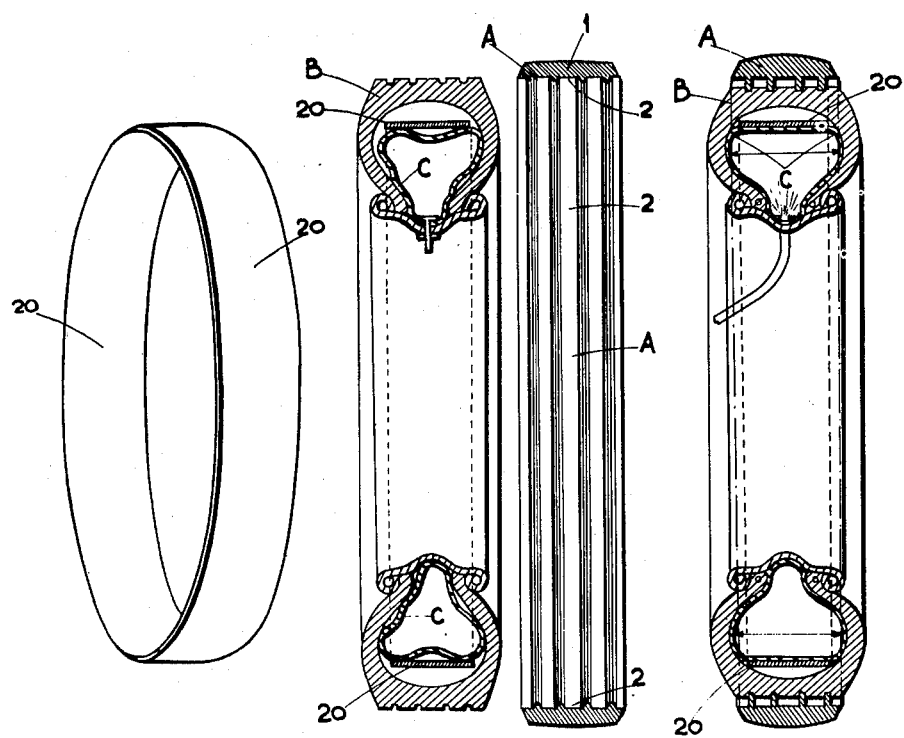
Fig. 7 is a special rim used for the assemblage of the tire.
Fig. 8 is a side elevational view, partly in section, of the cover of the tire with the inner tube and the rim of Fig. 7 inserted and ready to receive the separately shown tread portion.
Fig. 9 is a side elevational view of the cover and tread assembly.

For this purpose, the assemblage of the tread A and the cover B may be brought about by means of a flat rim in form of a smooth-faced band 20, shown perspectively in Fig. 7. Said rim may be made of a suitable metal such as brass, aluminum, zinc, galvanized iron or steel, and the like. Its width and diameter are calculated so as to enable it to be placed inside the cover B, as diagrammatically shown in cross section in Fig. 8. In this way, a free space or cavity is left in the upper part of the inside of the cover B above the rim 20, which free space should be equivalent to about one fourth of the total cavity of the cover inside. After positioning the rim 20 the inner tube C of the cover B will be inserted and the cover put on the wheel as usual with proper adjustment to the rim system and to the mounting of the inflation valve. Subsequently, air will be injected under pressure in the inner tube C through the inflation valve in an amount necessary for extending the inner tube, restrained by the rim 20, laterally inside the cover B; thus, a transversal and simultaneous pressure is exerted upon the middle and lower portions of the side and inner walls of the cover B, which pressure produces a contraction of the upper part of the cover and consequently reduces the total height of the same, Fig. 9. Care will be taken that the obtained reduction of the height of the cover B is strictly confined to that which is necessary for making it possible to place readily the tread portion A upon the cover B and the ribs into the corresponding grooves, as shown in Fig. 9. Presently, the valve of the inner tube C will be opened (Fig. 10); after having been deflated the tube will stop exerting any pressure upon the side and inner walls of the cover B. Because of its elasticity the cover will return to its normal form and resume its total height, which automatically entails the first step in the coupling of the tread A with the cover B. After tread and cover have taken hold of each other the cover B is dismounted from the wheel and the inner tube C and the rim 20 are taken out of the cover. To accomplish the final perfect assemblage between tread and cover a wooden or metal shoe is introduced into the cover; said shoe fills out the inside of the cover and serves as a rigid base or support on which the firm union between tread and cover is attained by means of suitable pressure or by repeated pounding with a wooden hammer upon the tread. For this purpose it is convenient to press and work several times the whole periphery of the tread A so that when the ribs are entering fully into the grooves the air may escape and eventually issue completely through the opening 21 of the small channel 9 (Fig. 5) provided transversally in the coupling profile of the cover B at a single point of one or both of its sides on the level of the basis of the grooves.

It may be noted that said channel of an approximate diameter of ½ mm., the purpose of which has been set forth hereinbefore, may be replaced by various bores or channels 22 disposed vertically through the tread portion A in a plane lying across of its periphery as indicated in dotted lines in Fig. 2. This vertical arrangement of the channels is sometimes convenient, particularly in covers for tires having a very rounded contour as viewed in side elevation. The diameter of the vertical channels is made as small as possible.

It is very convenient to mark the tread A with a red point, circle, or the like to indicate the place of the vertical perforations; this makes it easier to find them when they shall be opened for dismounting the tread A.

It is not necessary to mark the opening of a transversal channel 21 (Figs. 3 and 5) which is just visible (Fig. 4) in one or both sides of the cover B. The transversal or vertical channels may be closed also by means of a non-curing solution or mastic, or by means of a suitable small pin or bolt provided with a head in form of a plug, which is impregnated with said solution. Before fitting the tread A on the cover B it is of advantage to talc the ribs; to prevent air and dust from entering between the margins 23 of the tread and cover (Fig. 5) a thin coating of a non-vulcanizing solution may be applied to said margins beforehand. It may be noted that in various forms of coupling profiles such as referred to hereinafter said slight cementing of the margins is not necessary because the assembly of tread and cover closes hermetically of itself, Fig. 22. After the thorough assemblage is ensured and the margins and channels have been closed, the wooden shoe is removed, the inner tube is inserted in the cover, the latter is normally put on the wheel and the tire with the incorporated tread portion is inflated.

In fitting the tread A on the cover B the metal rim 20 may be replaced by an inextensible band of duck or other fabric forming a ring having the same dimensions as the metal rim.

By means of metal rims 20 or bands of different appropriate dimensions and strength, treads A may be mounted on, and dismounted from, covers B of all sections, small, medium, large and giant.

To dismount the tread portion A from the cover B, the procedure is inverse to that described hereinbefore, namely:

(1) If cemented, the margins of the tread and cover are separated by means of a non-cutting steel point, and in order to admit air in between the profiles the apertures of the channels and perforations are opened by a suitable awl;

(2) The tire is dismounted from the wheel and the inner tube is taken out of the cover B;

(3) The belt or metal rim 20 is placed in the cover B and the said inner tube C is then placed below the metal rim or inextensible belt and the tire is put normally on the wheel;

(4) Air is injected under pressure in the tube through the inflation valve in an amount indispensable for causing the tube to press against the middle and lower part of the side and inner walls of the cover B and to produce a decrease or lowering of the total height of the cover B, which will accordingly loosen or strongly assist in loosening the ribs of the tread portion A, whereupon the dismounting will be completed, if necessary, with the help of a suitable lever of hard wood or non-cutting metal.

Though this operation for assembling and disassembling the tread A and the cover B is sufficiently expeditious and practical it may be still more facilitated by using the device D, Fig. 11, especially designed for this purpose. The device D consists of a tubular air chamber 24 which is ring-shaped but flattened at its outer face and made, like all air tubes, of soft, very flexible, extensible and resistant cured rubber and provided with an inflation valve. An annular endless inextensible belt 25 of fabric or duck is secured to the outer flat face of the tube 24 and centered thereupon so as to encircle the tube 24 over its whole circumference.

It may be noted that the total height of the tube 24 as restrained and enclosed by the belt 25 is so adjusted that after inserting the device D in the casing B, as shown in Fig. 12, a cavity or free space remains in the upper part of the inside of the casing B, as has already been stated with regard to the metal rim used for the mounting and dismounting.

It is not deemed necessary to describe the mounting and dismounting by means of the device D more in detail since the operation is identical with that described for the same purpose by means of the metal rim 20. The only difference is, of course, that instead of using the metal rim together with the inner tube proper it is the device D which is put into the cover B, Fig. 12, and caused to act upon the inner side walls of the same by means of the inflation pressure of the tube 24, Fig. 13, in order to produce the desired decrease of the total height of the cover B or to restore its normal height by deflating the tube 24, Fig. 14. The device D is inserted and withdrawn for the successive manipulations in the manner already described hereinbefore.

From the foregoing it will be seen that in assembling and disassembling the tread and cover, the device D assumes the function of the metal rim in conjunction with the inner tube proper. Said manipulations, however, may be carried out quicker and above all with more precision by means of the device D than with the metal rim or inextensible belt because the latter when placed inside the cover may glide to the one or other side and come out of center entailing losses of time and inconveniences.

It will be noted that the same device D may serve for covers B of different sections. In this respect the pertinent dimensions of the device D are the width and diameter of the inextensible belt 25 which have to be sufficient to permit of placing the device D inside the cover B while leaving in the interior thereof the necessary free space, Fig. 12; further the diameter of the rim of the wheel on which the tire is fitted, which diameter must obviously correspond to the inner diameter of the cover B, which in turn corresponds to the inner diameter of the tube 24 of the device D to be placed in the cover B. Due to the great extensibility of the tube 24 of the device D, it is only necessary to inject a greater or smaller amount of air, according to the larger or smaller section of the cover B, to obtain the desired pressure and effects upon the side and inner walls of the cover B.

It is sufficient to construct various types of devices D in distinct and appropriate dimensions and strength to effect the assembling and disassembling of treads A and covers B of all sections, from small to giant size. (Synthetic butyl rubber appears to be very suitable for the manufacture of the device D.)

It may be also noted that for the sake of greater convenience in the successive manipulations of assembling and disassembling the treads and covers, use may be made of a strong but light wheel of light metal or wood, provided with a rim of a type and of dimensions identical with the rim of the vehicle wheels on which the tires formed by the assemblage of treads A and covers B have to be fitted. Therefore, instead of performing the various assembling and disassembling manipulations on the heavy and loose vehicle wheel itself they may be carried out on such a lighter and handier auxiliary wheel which may be secured in different and convenient positions to a work bench.

b. A particularly adherent form of the coupling profile is shown diagrammatically in transverse section in Fig. 15. It consists like the previously described form of trapeziform ribs but the ribs present concave tops or crests 26 conforming to convex bottoms 27 of the grooves; this brings about a sucker-like action when the ribs are completely encased in the grooves, and therefore this form may be designated as a "sucker-type coupling profile."

c. Fig. 16 shows diagrammatically in transverse section a form of profile similar to the precedent "sucker-type coupling profile," namely ribs having concave tops or crests 26 separated from each other by intervening spaces having a convex contour 28. The concave crests 26 of the ribs conform to the convex bottoms 27 of the grooves and the convex contours 28 of the intervening spaces between the ribs conform to the concave intervening spaces 29 between the grooves producing a double sucker action when the ribs are encased in the grooves. This form may be designated as "double-acting sucker-type coupling profile."

d. Fig. 17 shows diagrammatically a fragmentary transverse view of a modification of the trapeziform ribs and grooves of the coupling profiles a, b, and c wherein the longitudinal ribs are provided along one or both of their flanks with undercut slight notches 30 at their bases in such a way that said notches conform to corresponding projections 31 provided at the edges of the grooves of the coupling profile of the cover B.

With respect to the channels for the removal and admission of the air it may be noted that they may be arranged satisfactorily in different ways according to the type of tire; in giant tires the channel located in the cover may be provided at its exit opening with a valve for removing the air by suction or simply with a metal tube hermetically closed by a screw, as indicated in dotted lines in Fig. 16, where the transversal channel is arranged below the grooves and communicates with them by vertical perforations or channels.

The coupling profiles formed by trapeziform ribs and grooves or other suitable designs have margins which, dependent on the type of tire, are about 1 to 5 cm. wide. Instead with smooth surfaces, see for instance Figs. 5 and 22, said margins 23 may be provided with transversely or obliquely grooved surfaces, Figs. 18 and 19, so that the projections and grooves of the tread margin and the cover margin dovetail with each other. Another disposition of the margins is represented in Fig. 20 where both margins of the crown of the cover B are provided with a longitudinal notch or groove of half round section in which engage corresponding projections 33 of equal section provided in the coupling profile of the tread portion A. In order to protect better the edges of the margins of the cover B, both margins 23 of the tread portion A may be provided with flanges, Fig. 22, adapted to embrace both edges and margins of the cover B over the whole periphery.

Generally, the various forms of the coupling profile have to be so designed as to ensure a constant and perfect adhesion of the tread portion and to prevent creeping and relative movements under all circumstances such as in sudden braking, accelerating or stopping or in quick and violent turns; such a perfect juncture excludes substantially any friction, heat generation and wear between the two profiles.

Essentially, four characteristic principal factors play a part in the coupling of A and B by means of trapeziform ribs and grooves, namely:

(1) Coupling by the exact and tight fitting of the tread portion A on the flat or convex crown of the cover B over the whole periphery and by a thorough engagement of the two profiles.

(2) Coupling by wedging the sides of the ribs in between the sides or walls of the grooves.

(3) Coupling by the action of the crests of the ribs upon the bottoms of the grooves and of the surface areas situated between the grooves on the surface areas situated between the ribs.

(4) Coupling and adhesion by removing the air entrapped between the ribs and grooves during assembling.

To these principal factors, which are involved in every coupling by means of trapeziform ribs and grooves, other factors may be added which contribute to ensuring and maintaining the assemblage, such as dovetailing the margins, undercutting the ribs, and even the slight deflection which every pneumatic tire suffers under the load of the vehicle in contact with the road, see Fig. 25.

e. Fig. 24 shows diagrammatically in transverse section a form of the coupling profile in which the tread A is provided at its inner face with a single rib 38 of trapeziform section; said rib, however, is not arranged in form of a cone or wedge but inversely, namely presenting at its widest side a concave top or crest which is embedded in the longitudinal groove 39 of exactly corresponding trapeziform section which groove forms the coupling profile of the cover B. It will be noted that a single channel or vertical perforation through the tread A is sufficient for the removal of the air when the tread and cover are joined with each other. To bring about the coupling it is only necessary to compress strongly the tread portion A from both sides in order to place the rib 38 in the corresponding groove 39 of the cover.

*f.* Figs. 20 and 21 represent diagrammatically a form of a coupling profile in which the tread portion A is provided with a coupling profile designed to fit into the crown of a cover presenting a profile, Fig. 20, which is composed of a longitudinal furrow or groove 32 at each margin and of a central groove 34; other equidistant and parallel short grooves 35 extend obliquely from the central groove to the lateral grooves. The inner face of the tread, Fig. 21, is provided with corresponding central and lateral ribs and oblique projections or lugs 36 exactly fitting into the corresponding depressions of the cover profile. This cover profile, which may be designated as "arrow-shaped," is also particularly suitable for covers B having a rounded crown, in which case the lateral grooves 32 and ribs 33 may be omitted. At any event, in this form of coupling profile a single bore hole or vertical channel through the tread portion is sufficient for the removal of the air. When assembling the tread A and the cover B by means of the device D, care must be taken of engaging first the margins so that the air contained in the short oblique grooves will accumulate in the center and lateral grooves of the cover and finally be discharged through the single vertical channel or hole of the tread A; the discharge opening of the channel may be provided with opening and closing means.

*g.* Generally, a coupling profile according to this invention may consist of any tread portion provided with an inner profile expressly designed to fit on the road engaging surface of a normal cover, i. e. in the projections and depressions or elevations and cavities which in the crown of a normal cover may form the design or contour of a non-skid tread; any tread portion provided on its inner face with a corresponding and conforming design may be secured to such cover surface to form a coupling when vertical discharge channels or bores are made through said tread, for instance by an awl.

As to the forms of coupling profiles described hereinbefore it may be added that the ribs and grooves may assume, instead of the wedge-shaped trapeziform section, other forms such as quadratic, half-round, oval, semihexagonal, and others, and that inversely the coupling profile of the tread portion A may consist of grooves and that of the cover B of ribs. Further, the ribs and grooves may be disposed not longitudinally but in other forms and directions such as obliquely, arrow-like, and the like, or transversely in form of transverse projections and depressions.

By means of the recited forms of coupling profiles the coupling of the tread with the cover may be satisfactorily brought about in all types of tires without exception. The manufacturers will adopt such forms or combinations as are most convenient from a practical and technical point of view for the type of tire which shall be produced by the assembly of tread and cover.

After having described the invention some complementary details may be pointed out in the following with particular reference to the advantages obtained.

The main factors which determine the better durability of tires provided with inlaid interchangeable tread portions may be resumed as follows: Said tread portion (1) absorbs the shocks in service;
(2) disposes with retreading the cover;
(3) absorbs the heat generated in service without transfering it to the remainder of the tire;
(4) protects the cover against injuries;
(5) reduces the pressure per unit of the tire upon the road surface;
(6) provides for a solid construction of the cover B.

Referring to these factors and beginning with (1), it may be stated that, when the process of deterioration in normal tires is carefully observed, it will be noted that said deterioration starts at once because the tread, subjected to heavy punishment due to the driving and to the irregularities of the road surface such as bumps, stones and other obstacles, transmits said impacts directly and in their entirety to the whole tire, of which the carcass and general texture already suffer from the injurious effects of the continuous pounding. These injurious effects intensify more and more with the increasing wear and ensuing weakening of the tread and cause a deterioration of the carcass of a normal tire even before the tread is worn out.

In contradistinction thereto, tires equipped with an inlaid replaceable tread portion are, because of the perfect vacuum coupling and particularly in view of the great strength and extremely robust structure of the tread portion A (which is 12 to 50 times superior to the most robust treads of normal tires), much less subject to the severe service stresses and road impacts, which do not exert upon them the same injurious effects as upon the 12 to 50 times weaker treads of normal tires. The inlaid detachable tread portion A acts as a shield and absorbs in itself wholly or almost completely the pounding and other injurious effects of the service; since said impacts are only indirectly transmitted, their effect upon the cover and the general structure of the tire is damped or practically nullified.

From an economic point of view it can be assumed that the cost of a cover B without the tread portion A will be equal to the cost of a whole cover of a normal tire. It can further be assumed that the cost of a tread portion will vary from about 40 per cent of the cost for the cover of a small tire to about 10 per cent of the cost for the cover of a giant tire. It will readily be seen that the use of tires provided with interchangeable and replaceable treads results in very substantial savings since not the cover but only the tread has to be replaced. This economic advantage becomes still more apparent when it is taken into account that it is not necessary to replace a worn tread by a new one. On the contrary, it is sufficient to dismount such tread portion from the cover and to subject its non-skid surface to a separate retreading treatment in appropriate molds and devices.

In this particular, it may be emphasized that the interchangeable and replaceable tread portion according to this invention has a much stronger structure and is much less delicate than a cover and that, therefore, the temperatures and pressures necessary for retreading have not the same injurious effects as upon covers but hardly affect its robust structure. On the other hand, due to the perfect assemblage between tread and cover, the coupling profiles are not subject to any substantial wear or alteration in their form and strength which makes the detachable tread portion very suitable for retreading.

(2) Any retreading operations of the pneumatic tires and, therefore, their injurious effects are completely avoided since the retreading of the non-skid surface of the tread portion is always carried out after it has been separated from the cover.

(3) In normal tires, the heat generated in service is entirely and directly transmitted to the remainder of the tire, the temperature of which rises immediately. In tires according to this invention, the tread portion, because of its strong structure and also due to the heat resisting layers and to the form of coupling which excludes friction and chafing, does not only not transfer directly the heat to the cover but also absorbs, acting in a manner analogous to that described with respect to the absorption of shocks, a great part of the generated heat. This essential advantage of tires provided with detachable inlaid tread portions becomes particularly evident in skidding or sudden brakings where it is readily observed that the generated heat is generally not transmitted, or if it is so in exceptional cases, only to such a small extent that it does not do any harm.

Though the property of absorbing a great part of the generated heat may generally be considered an inherent quality of the inlaid tread portion suitably designed according to the norms of this invention, it may be noted that a detachable tread portion carrying embedded one or more layers of heat resisting natural or synthetic fabrics, which form a truly heat insulating zone, does not only absorb the heat generated in service without transferring it to the carcass B but also protect it to a great extent against the solar radiation and high road surface temperatures preventing any injurious rise of temperature inside the cover.

(4) Said robust construction of the detachable tread portion and the manner in which the coupling and securing to the cover is performed do not only protect the cover against bursting and wearing stresses but impart thereto at the same time such an extraordinary reinforcement and strength that the dimensions of the whole tire may be considerably increased so as to permit of increasing the air volume by about 10 per cent in various types of tires and even more in tires of medium and large sections. The increase of the air volume increases the load capacity of the novel tire, limits the heating up and reduces the possibility of blowouts, ensuring a maximum safety, comfort and convenience for driving.

On the other hand, the increase of the dimensions of the tire permits of increasing the width of the non-skid surface of the tread portion A, thus decreasing the pressure per unit of the tire upon the road and reducing accordingly its wear, which remains an important advantage, particularly in large tires for heavy-duty and ultra-heavy vehicles.

It may further be noted that, since the resistancy of the tread portion is 12 to 50 times greater than that of the most robust treads of normal tires, the tread is so much strengthened as to permit readily the use of tires of very reduced pressures while suppressing any "shimmying" even in super-balloon types providing at all times and under all conditions satisfactory cushioning, comfort and safety.

(5) Though the manufacture of a tire with an inlaid detachable tread portion requires somewhat more rubber or similar materials than the manufacture of a normal tire, this is amply and advantageously compensated by the savings obtained in changing only the tread portions instead of replacing the whole tire.

As a matter of fact, in tires having an inlaid detachable tread portion, the wear and deterioration of the rubber takes place only there where it is inevitably produced, i. e. in the non-skid surface of the tread portion, which can be easily and economically repaired, whereas the cover B, efficiently protected against pounding, heat, scraping, chafing and harmful road impacts, reaches an unexpectedly prolonged life. Therefore, it can be estimated that in the manufacture of the new tires the over-all savings in the total consumption of rubber amount to 30 to 40 per cent.

(6) The possibility of changing quickly and at all times the non-skid surfaces of pneumatic tires in accordance with the requirements of the road surface and changing weather conditions is an indisputable advantage, which, in fact, is much more important than apparent at first glance because grave accidents, which occur all over the world due to snow-covered or slippery roads, are much more frequent than generally assumed.

The drawbacks of anti-skid ropes or chains or other appliances are well known; frequently they are of little help in overcoming the difficulties of such roads. In such cases, the only efficient remedy would be to have ready at all times various sets of spare tires having different non-skid surfaces but this would result, in addition to the increased load, in insupportable discomfort in view of the space occupied by the special tires in the car.

Interchangeable treads, however, can be readily put into any car; when coming upon snow-covered or slippery roads the inlaid tread bands may be replaced in a few minutes by means of the device D by other tread bands having the required special non-skid surface, be it for a snow-covered or slippery road, thus avoiding serious accidents or delays.

From an aesthetic point of view it is to be noted that color of the tread band can be combined or contrasted harmonically with the colors of the tire cover and the car; pleasing color contrasts can be obtained for instance by combining a black cover with a red, blue, white or else colored tread band and vice versa. A further aesthetic advantage of the new combination is that the detachable tread portions look always new even after the carcass of the tire has seen a service several times longer than the life of a normal tire.

What I claim is:

1. A replaceable tread tire comprising a tire cover and a detachable flexible annular tread portion, a coupling profile in the form of a relief design on the crown of said cover extending longitudinally over the whole periphery thereof, a corresponding coupling profile on the inner face of said tread portion in the form of a conforming relief design engaging and interlocking with said first relief design, and outlet means adapted to discharge air entrapped between said two profiles to the outside when the tire cover and tread portion are assembled, said outlet means being closed during service of the tire to prevent the entry of air in between said profiles.

2. A replaceable tread tire comprising a tire cover and a detachable flexible annular tread portion, a coupling profile in the form of a relief design on the crown of said cover extending longitudinally and transversally over the whole periphery thereof, said tread portion having a corresponding coupling profile on the inner face thereof in the form of a conforming relief design engaging and interlocking with said first relief design, and outlet means adapted to discharge air entrapped between said two profiles to the outside when the tire cover and tread portion are assembled, said outlet means being closed during service of the tire to prevent the entry of air in between said profiles.

3. A replaceable tread tire comprising a tire cover and a detachable flexible annular tread portion, a coupling profile in the form of a relief design on the crown of said cover extending longitudinally over the whole periphery thereof, said tread portion having a corresponding coupling profile on the inner face thereof in the form of a conforming relief design engaging and interlocking with said first relief design, and recesses in the outer wearing surface of the tread portion, and narrow channels leading through the projections of the inner profile of the thread portion into said recesses of the outer surfaces.

4. A replaceable tread tire as defined in claim 1 comprising at least one air discharge channel leading vertically from the inner face of the tread portion to the outside thereof.

RODOLFO LUCHSINGER CABALLERO.

REFERENCES CITED

The following references are of record in the file of this patent:

UNITED STATES PATENTS

| Number | Name | Date |
|---|---|---|
| 627,483 | Comly | June 27, 1899 |
| 1,053,953 | Ascheri | Feb. 19, 1913 |
| 1,054,820 | Bowden | Mar. 4, 1913 |
| 1,127,038 | Livingston | Feb. 2, 1915 |
| 1,478,156 | Whitcomb | Dec. 18, 1923 |
| 1,494,621 | Ogilvie | May 20, 1924 |
| 1,518,529 | Linderme | Dec. 9, 1924 |

FOREIGN PATENTS

| Number | Country | Date |
|---|---|---|
| 17,285 | Great Britain | of 1909 |